United States Patent
Chambliss et al.

(10) Patent No.: US 9,817,865 B2
(45) Date of Patent: Nov. 14, 2017

(54) DIRECT LOOKUP FOR IDENTIFYING DUPLICATE DATA IN A DATA DEDUPLICATION SYSTEM

(71) Applicant: INTERNATIONAL BUSINESS MACHINES CORPORATION, Armonk, NY (US)

(72) Inventors: David D. Chambliss, Morgan Hill, CA (US); Jonathan Fischer-Toubol, Tel Aviv (IL); Joseph S. Glider, Palo Alto, CA (US); Danny Harnik, Tel Mond (IL); Ety Khaitzin, Holon (IL); Yifat Kuttner, Kochav Yair (IL); Michael Moser, Tel Aviv (IL); Yosef Shatsky, Karnei Shomron (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/960,982

(22) Filed: Dec. 7, 2015

(65) Prior Publication Data
US 2017/0161329 A1    Jun. 8, 2017

(51) Int. Cl.
G06F 17/30    (2006.01)

(52) U.S. Cl.
CPC .............. *G06F 17/30489* (2013.01)

(58) Field of Classification Search
CPC ......... G06F 17/30194; G06F 17/30489; G06F 17/30303; G06F 17/30159; G06F 17/305; G06F 12/0891
USPC ......... 707/639, 692; 711/135, 136, 162, 104
See application file for complete search history.

(56) References Cited

U.S. PATENT DOCUMENTS

| | | | |
|---|---|---|---|
| 8,370,315 B1* | 2/2013 | Efstathopoulos ... | G06F 17/3015 707/696 |
| 8,631,052 B1* | 1/2014 | Shilane ............. | G06F 17/30156 707/825 |
| 8,667,032 B1* | 3/2014 | Shilane ............. | G06F 17/30156 707/825 |
| 8,762,349 B2* | 6/2014 | Jayaraman ........ | G06F 17/30159 707/692 |
| 8,930,648 B1 | 1/2015 | Storer et al. | |
| 9,020,900 B2 | 4/2015 | Vijayan Retnamma et al. | |
| 9,069,786 B2 | 6/2015 | Colgrove et al. | |
| 9,189,414 B1* | 11/2015 | Shim ...................... | G06F 12/08 |
| 9,189,421 B2* | 11/2015 | Testardi .............. | G06F 11/1453 |
| 9,251,160 B1* | 2/2016 | Wartnick ........... | G06F 17/30156 |
| 9,317,218 B1* | 4/2016 | Botelho ................ | G06F 3/0655 |
| 9,336,143 B1* | 5/2016 | Wallace ................ | G06F 12/121 |
| 9,390,116 B1* | 7/2016 | Li ...................... | G06F 17/30336 |
| 9,430,164 B1* | 8/2016 | Botelho ................ | G06F 3/0655 |
| 9,514,146 B1* | 12/2016 | Wallace ............. | G06F 17/30153 |
| 2011/0099154 A1* | 4/2011 | Maydew ........... | G06F 17/30156 707/692 |

(Continued)

*Primary Examiner* — Jean M Corrielus
(74) *Attorney, Agent, or Firm* — Griffiths & Seaton PLLC

(57) ABSTRACT

Various embodiments for identifying data in a data deduplication system, by a processor device, are provided. In one embodiment, a method comprises efficiently identifying duplicate data in the data deduplication system by identifying fingerprint matches using a direct inter-region fingerprint lookup to search for the fingerprint matches in at least one of a plurality of metadata regions, the direct inter-region fingerprint lookup supplementing a central fingerprint index.

24 Claims, 4 Drawing Sheets

(56) References Cited

U.S. PATENT DOCUMENTS

| | | | |
|---|---|---|---|
| 2011/0167221 A1* | 7/2011 | Pangal | G06F 11/1453 711/117 |
| 2011/0258374 A1* | 10/2011 | Pertocelli | G06F 3/0608 711/104 |
| 2011/0307447 A1* | 12/2011 | Sabaa | H04L 67/2842 707/637 |
| 2012/0173822 A1* | 7/2012 | Testardi | G06F 11/1453 711/135 |
| 2013/0246711 A1* | 9/2013 | Testardi | G06F 11/1453 711/135 |
| 2014/0040205 A1* | 2/2014 | Cometto | G06F 17/30194 707/639 |
| 2014/0201308 A1* | 7/2014 | Rhea | H04L 12/6418 709/213 |
| 2014/0201384 A1* | 7/2014 | Rhea | H04L 67/2842 709/231 |
| 2014/0201385 A1* | 7/2014 | Rhea | H04L 12/6418 709/231 |
| 2015/0293848 A1* | 10/2015 | Hyde, II | G06F 12/0891 711/135 |
| 2016/0026652 A1* | 1/2016 | Zheng | G06F 17/30097 707/692 |
| 2016/0026653 A1* | 1/2016 | Caro | G06F 17/30159 707/692 |
| 2017/0116229 A1* | 4/2017 | Harnik | G06F 17/30303 |

* cited by examiner

DIRECT LOOKUP FOR IDENTIFYING DUPLICATE DATA IN A DATA DEDUPLICATION SYSTEM

BACKGROUND OF THE INVENTION

Field of the Invention

The present invention relates in general computing systems, and more particularly to, various embodiments for identifying duplicate data in data deduplication systems in computing storage environments.

Description of the Related Art

Today with modern technology, large volumes of data are storable on disk drives; these drives can exist as a solo entity, or as part of a broader make up within a larger storage environment. Often times when writing to even the smallest environment, single drives, duplicate data is written. These duplicated contents can then be DE-duplicated using standard deduplication techniques so long as specific metrics are met.

SUMMARY OF THE INVENTION

Various embodiments for identifying data in a data deduplication system, by a processor device, are provided. In one embodiment, a method comprises efficiently identifying duplicate data in the data deduplication system by identifying fingerprint matches using a direct inter-region fingerprint lookup to search for the fingerprint matches in at least one of a plurality of metadata regions, the direct inter-region fingerprint lookup supplementing a central fingerprint index.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
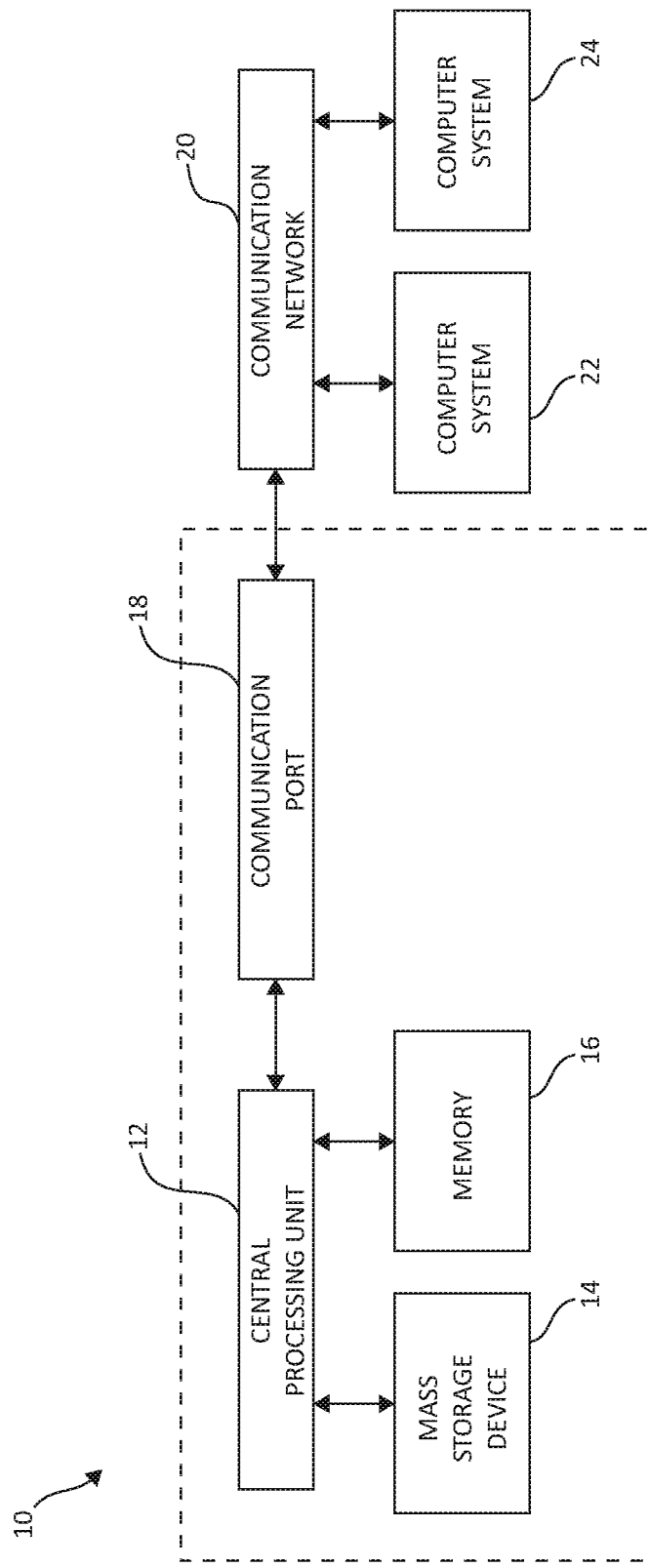
FIG. 1 is a block diagram showing a hardware structure for performing repository management in data deduplication systems, in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.).

With the continued advancement of computer processors and memory, data storage space has begun to lag behind. While storage space has indeed increased, the demands on the existing space have increased dramatically as well. This increase in demands has resulted in new avenues being explored to better utilize the given storage at hand. Data deduplication is one of those avenues. Modern data deduplication users can achieve 10, sometimes up to 20, (or even greater) times the original storage capacity. In other words, the same user, with the benefit of deduplication technology, essentially has the capacity of ten storage units where the user originally had one, without any additional space or power requirements.

The concept of deduplication techniques is to replace duplicate data across a storage system with pointers to a single instance of the data, and hence reduce an overall storage requirement. The design of such a deduplication system requires handling several challenges. Firstly, duplicate data should be identified across potentially very large amounts of data. Once duplicates are found, the system must be able to maintain data in a format containing cross references over the entire system. Often times, this format is a metadata format.

Duplicates are typically identified by the holding of a large index of data chunks that have already appeared in the system (chunks can be of varying sizes). Typically, the index contains fingerprints of chunks representing the data itself, such that the fingerprint is usually a hash value of the actual data in the chunk. Finding repeating fingerprints amounts to identifying repeating chunks of data. The complication is that for a large storage system, the amount of fingerprints may grow to become extraordinarily large, and keeping a full index in memory is simply not feasible. This is especially troublesome in a distributed storage system (where such an index is accessible by several nodes). Rather, systems keep a smaller index in memory and are either content to miss out on potential deduplication opportunities or resort to supplementary mechanisms that make up for the limited in-random access memory (RAM) index.

It should be noted that keeping an entire index on various media, such as disk (be it flash or hard disk drive (HDD)), is scalable in terms of sheer index size, however has a profound time performance impact. Since the index consists of mostly random hashes, it is typically accessed randomly and hence is not susceptible to standard caching techniques.

A number of works and methods exist to deploy a layered strategy for handling an index. The first layer is generally a cache in RAM and a second layer on a slower media. The idea is to minimize the lookups to the slower layer by prefetching fingerprints that may be relevant to RAM, and performing a first look up in the RAM cache. This prefetching is locality based—once a new fingerprint has been found in the index, the RAM fingerprints that appeared together with the fingerprint in the past (neighboring fingerprints) are analyzed, hoping they will yield increased cache hits (matches).

Each of these methods hold a central cache for all lookups. This has an inefficiency in a distributed storage system that handles multiple parallel input sources that are not necessarily related to one another, yet all perform lookups in the same central cache. Moreover, populating the cache may at times be a heavy task, especially in a distributed system where the cache is spread across several nodes.

Accordingly, the illustrated embodiments provide mechanisms for improving deduplication efficiency and speed. These mechanisms are especially advantageous in a large scale distributed storage environment with limited memory, although one of ordinary skill would recognize the mechanisms provided herein may be beneficial for a wide variety of storage systems. In one embodiment, a direct inter-region fingerprint lookup is implemented to supplement a central fingerprint index. The direct lookup mechanism is region dependent, such that each region connects only to the regions that are most relevant to it. The direct lookup may serve as a primary fingerprint search mechanism before accessing the standard index lookup mechanism.

The targeted environment is that of a large primary storage system that receives multiple reads and writes, typically of varying sizes (unlike backup streams that handle solely long sequential writes), although, as aforementioned, may be suitable for a wide body of storage environments. In this manner, data typically has strong locality properties that may be of benefit—namely, the evidence that repeated data tends to appear in batches. Another such property of large and distributed data stores is the case of each region managing its metadata separately. This will provide further benefit as will be described.

The illustrated embodiments provide a mechanism building on existing regional metadata structures to avoid extra effort of populating central indexes, and thus achieve improved deduplication speed. There are several benefits to this mechanism, including: 1. The standard index is considerably smaller making the mechanisms of the present invention very scalable; 2. Repopulation of the index with neighboring fingerprints is not required; 3. Duplicated data may be found even if an owning region's hashes have been evicted from the fingerprint index, since a regional connection still exists; and 4. Fragmentation in the data layout is reduced caused by the main index pointing to multiple regions in a scattered fashion. Other benefits will be discussed.

Turning first to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
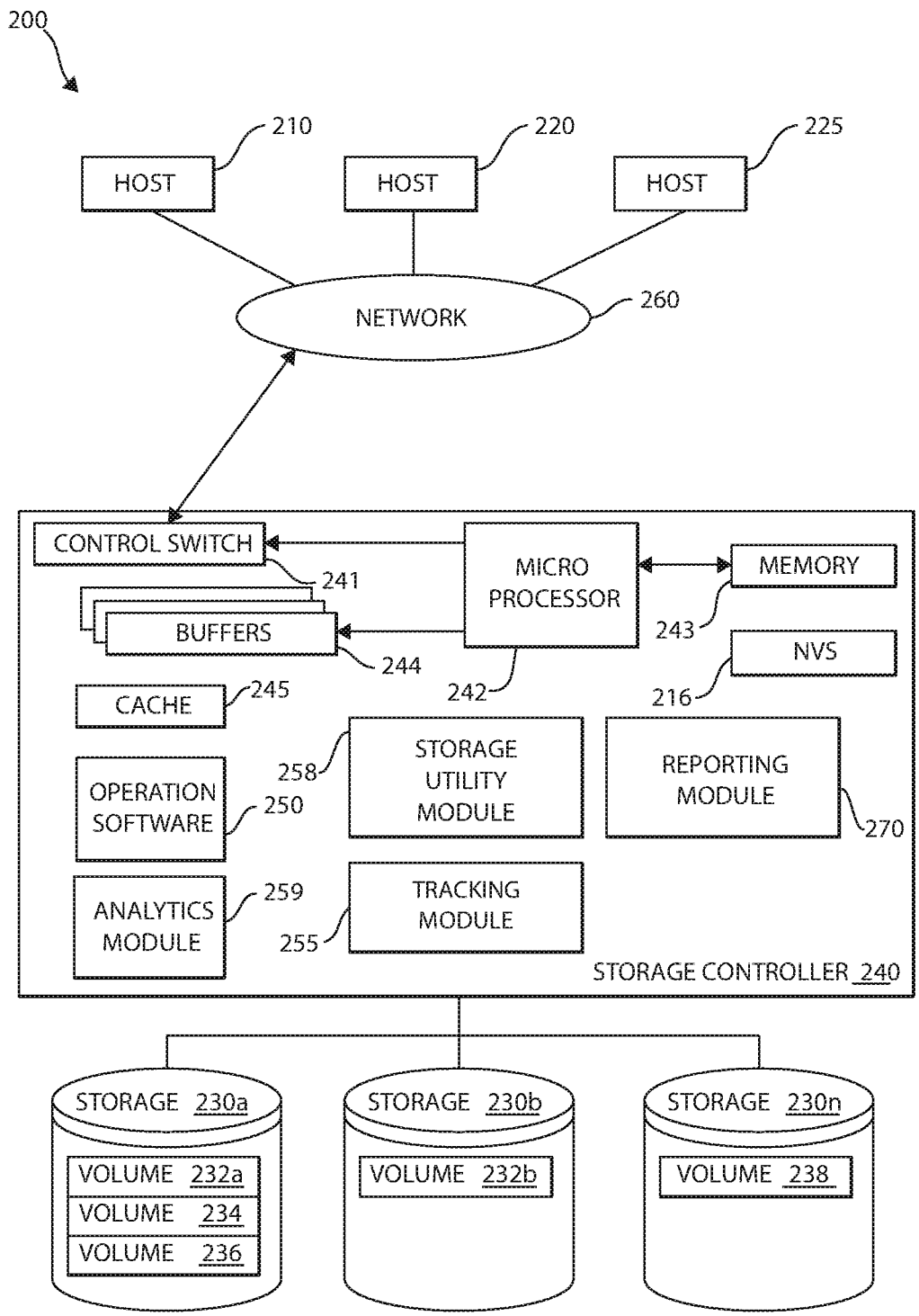
FIG. 2 is a block diagram showing a hardware structure of a data storage system in a computing storage environment, again in which aspects of the present invention may be realized.

FIG. 2 is an exemplary block diagram 200 showing a hardware structure of a data storage and deduplication system that may be used in the overall context of repository management in data deduplication systems. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® Protec-TIER® deduplication system TS7650G™, although one of ordinary skill in the art will recognize that a variety of deduplication hardware and software, separately or in combination, may be utilized to implement the data deduplication functionality according to aspects of the illustrated embodiments.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory," for buffering "write data" and "read data," which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a tracking module 255, a storage utilization module 258, and a reporting module 270. The tracking module 255, storage utilization module 258 and reporting module 270 may operate in conjunction with each and every component of the storage controller 240, the hosts 210, 220, 225, and storage devices 230. The tracking module 255, storage utilization module 258 and reporting module 270 may be structurally one complete module or may be associated and/or included with other individual modules. The tracking module 255, storage utilization module 258 and reporting module 270 may also be located in the cache 245 or other components.

The tracking module 255, storage utilization module 258 and reporting module 270 may individually and/or collectively perform various aspects of the present invention as will be further described. For example, the tracking module 255 may perform tracking operations and related analytics in accordance with aspects of the illustrated embodiments. The storage utilization module 258 may also utilize analytics to determine physical or virtual storage capacities in view of deduplication functionality operational on particular storage devices. Finally, reporting module 270 may notify various portions of the data storage and deduplication system 200 about such various aspects as current capacity utilization, and so forth. As one of ordinary skill in the art will appreciate, the tracking module 255, storage utilization module 258, and reporting module 270 may make up only a subset of various functional and/or functionally responsible entities in the data storage and deduplication system 200.

The storage controller 240 includes a control switch 241 for controlling the fiber channel protocol, transmission control protocol/internet protocol (TCP/IP), Ethernet protocol, or other such standard, to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the tracking module 255, and the analytics module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

Figure 3:
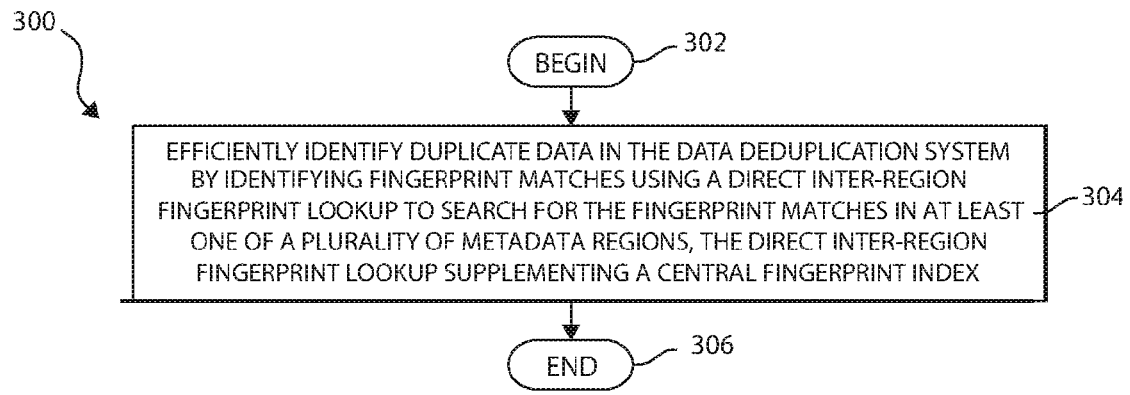
FIG. 3 is a flow chart diagram illustrating a method for identifying duplicate data in data deduplication systems in accordance with various aspects of the present invention.

Turning now to FIG. 3, a flow chart diagram illustrating an exemplary method 300 for identifying duplicate data in data deduplication systems, among other aspects of the illustrated embodiments, is depicted. As aforementioned the method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

The method 300 begins (step 302). Duplicate data is efficiently identified in a data deduplication system by identifying fingerprint matches using a direct inter-region fingerprint lookup to search for the fingerprint matches in at least one of a plurality of metadata regions, the direct inter-region fingerprint lookup supplementing a central fingerprint index (step 304). The method ends (step 306).

The mechanisms herein rely generally upon two components, comprising, a central fingerprint index, which is a global repository of fingerprints and serves a full cluster of nodes, and metadata regions, which provide metadata (including fingerprints) for a defined area of user space. For example, a metadata region may be defined to span 128 MB of user space.

The central fingerprint index may be accessed from any point in the system and indicates in which metadata region, if any, a fingerprint may be found. In this way, the index is essentially a fingerprint to owning metadata region lookup table. The central fingerprint index is always kept in memory and may greatly benefit from intelligent eviction processes provided herein.

Metadata regions are a division of user space into small areas (regions) that are swapped in and out of memory. This metadata serves deduplication in addition to other features that are likely to be provided by the storage system, such as compression and thin provisioning. A metadata region contains fingerprints for all data chunks written to the metadata region. The metadata region is responsible for the fingerprint it contains regarding reference creation, deletion, reference counting, and eventual deletion of the chunk and its fingerprint. Given the aforementioned infrastructure, it is possible for Region 1 to create a reference to Region 2 without needing the index.

Owing to aspects of the present invention, a direct inter-region fingerprint lookup provides a source for deduplication opportunity searches above and beyond the central fingerprint index described above. In one embodiment, each metadata region gains a dynamic ability to look for matching fingerprints in a subset of other metadata regions, where the set of metadata regions that each metadata region chooses to look may change according to an input/output operation (I/O) workload. This direct inter-region fingerprint lookup greatly expands the deduplication opportunities each metadata region can leverage with no extra metadata cost.

In one embodiment, each metadata region maintains a list of owner regions to which it has already created references to. This list is called the "active owners" list. Once a deduplication reference is created from a first metadata region to a second metadata region, via a hit (fingerprint match) in the index, the first metadata region adds the second metadata region to its active owners list. New writes to the first metadata region will then search for matching fingerprints in the metadata regions contained within the first metadata region's active owners list. Since deduplication (by fingerprint matches) tends to be in batches, there is a high probability that additional fingerprint matches will be found in one of the active owners. If fingerprint matches are not found within any of the metadata regions contained in the active owners, the central fingerprint index is then searched.

Using the direct inter-region fingerprint lookup algorithm, a vast majority of fingerprint matches are found by means of direct inter-region fingerprint lookup, and not by way of the central index lookup. The purpose of the index therefore becomes to provide a first fingerprint match to an owner region, and provide fingerprint matches for exceptional cases in which the deduplication is not localized to a particular metadata region. This is accomplished using a central fingerprint index that is considerably smaller than a standard index, thereby reducing memory requirements and improving scalability.

The functionality of the present invention avoids potential timing issues that may occur in a standard indexing/caching solution. In a traditional index, when a match occurs, the cache must be repopulated. During the repopulation process, potential matches may be missed before the repopulation has completed. Using the direct inter-region fingerprint lookup functionality, however, lookups are sent directly to the owning metadata region. The owning metadata region may delay a response if it must load fingerprints in to memory.

Figure 4:
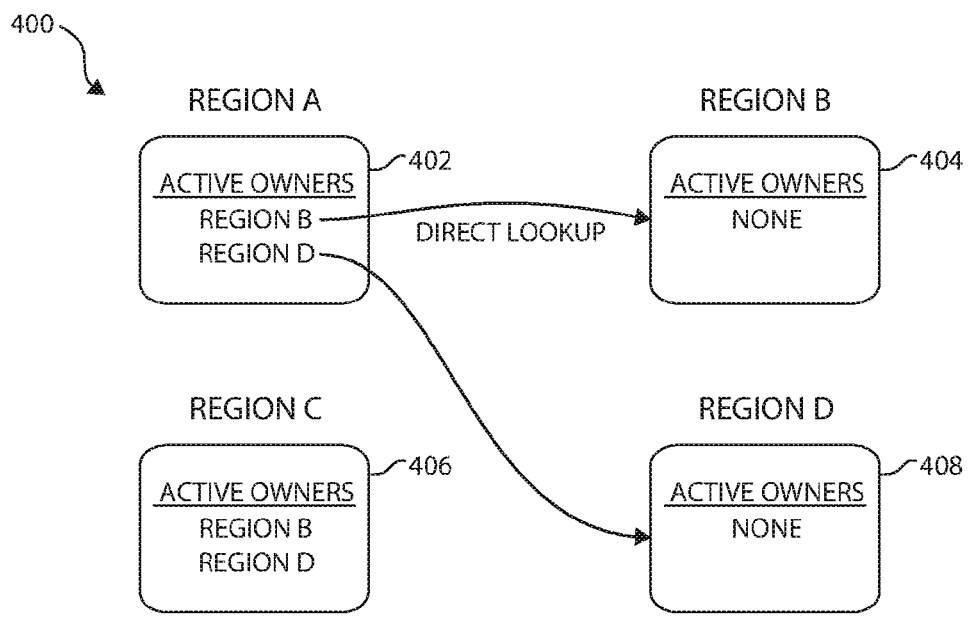
FIG. 4 is a block diagram illustrating a plurality of metadata regions in accordance with various aspects of the present invention.

FIG. 4 is a block diagram representing a plurality of metadata regions 400 illustrating the concepts described previously. Shown is Region A 402, Region B 404, Region C 406, and Region D 408. Region A shows on it's active owners list, active owners Region B 404 and Region D 408. Likewise, Region C shows on it's active owners list, active owners Region B 404 and Region D 408. Region B 404 and Region D 408 show no present active owners. This demonstrates that both Region A 402 and Region C 406 have found previous fingerprint matches within Region B 404 and Region D 408.

Using the direct inter-region fingerprint lookup mechanism, Region A 402 (and similarly Region C 406), when receiving a write operation, will first search for fingerprint matches within the metadata regions listed on their respective active owners lists before searching the central fingerprint index. In this example, Region B 404 and Region D 408.

In one embodiment, when evicting an owner from a metadata region's active owners list, an eviction policy may be made reference to the eviction logic of the quality of the connection to each owner. For example, an active owner to which there are few references made via fingerprint matches will be evicted before an owner to which there are many references. This may be a predetermined threshold. Logic such as a most recently used, most frequently used, least recently used, or least frequently used lists may be implemented in determining this threshold.

In other embodiments, active owners may be removed from an active owners list if the list is full and a new active owner is being inserted. Additional eviction logic in accordance with the eviction policy based on missed matches to an owner may be used. Assuming Region B 404 is an active owner of Region A 402, after unsuccessfully looking for fingerprint matches in Region B 404 several times as determined by a predetermined threshold, Region B 404 may be removed from the active owners list of Region A 402.

In some embodiments, when an inter-region direct lookup request is sent to a metadata region that is not currently in memory, it may be decided by the requesting metadata region to either load or not load the metadata region to it's active owner list. If the region is not added to the active owners list, no resources are spent, and it is assumed that metadata region not being in memory indicates that there is no deduplication currently taking place to this metadata owner region. The decision to load or not to load a metadata region to the requesting metadata region's active owners list may be determined by a predetermined threshold of memory consumption and/or a predetermined threshold of central processing unit (CPU) consumption expected. Within an owning metadata region, fingerprints may be loaded in to memory selectively based on a popularity, memory consumption, and/or a CPU consumption. Again, this may be determined by a predetermined threshold of consumption expected.

Depending on the size of a user write, the write it is likely to contain several chunks. Therefore, in some embodiments, if none of the chunks' fingerprint matches were found by the direct inter-region fingerprint lookup, a lookup to the central fingerprint index will be performed. If all the fingerprint matches are found within a metadata owner region, no central metadata index lookup needs to be performed. If some fingerprint matches are found however some are not, both the direct inter-region fingerprint lookup and central fingerprint mechanisms are plausible. A predetermined threshold may be defined such that if a predetermined number of fingerprint matches are found by direct inter-region fingerprint lookup being below the threshold, a central fingerprint index lookup is initiated.

Figure 5:
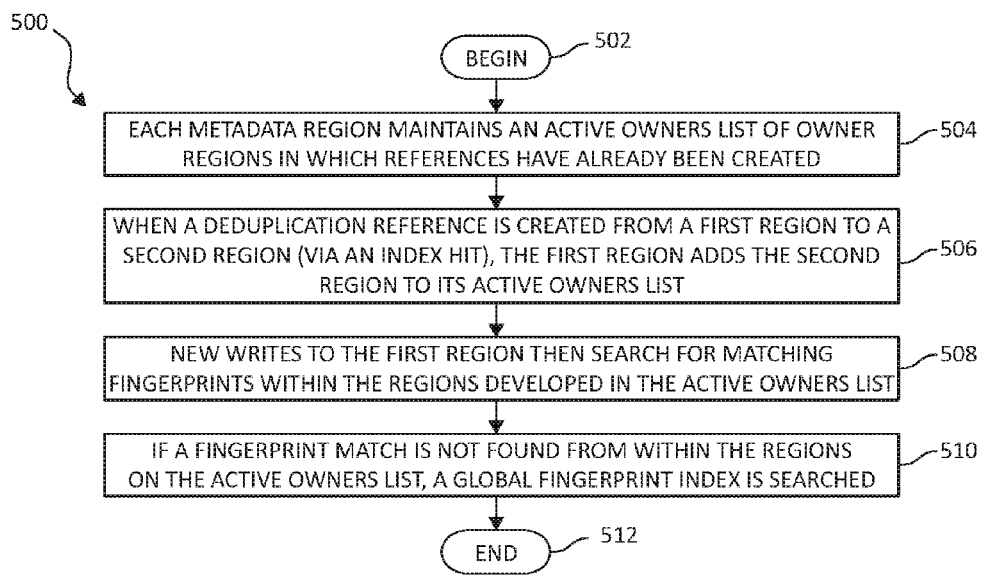
FIG. 5 is an additional flow chart diagram illustrating a method for identifying duplicate data in data deduplication systems in accordance with various aspects of the present invention.

Continuing to FIG. 5, a flow chart diagram, illustrating an exemplary method 500 for identifying duplicate data in data deduplication systems is depicted in review of the illustrated embodiments, according to aspects of the present invention. The method 500 may be performed in accordance with the present invention in any of the environments depicted in FIGS. 1-2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 502, metadata regions are defined, where each metadata region maintains an active owners list of owner regions in which references have been created, via fingerprint matches (step 504). When a deduplication reference is created from a first region to a second region by the fingerprint matches, the first region then adds the second region to its active owners list (step 506). New writes to the first region then search for matching fingerprints within the regions developed on the active owners list of the first region (step 508). If a fingerprint match is not found from within the regions defined on the active owners list of the first region, a central fingerprint index is then searched (step 510). The method ends (step 512).

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for identifying data in a data deduplication system, by a processor device, comprising:
    identifying duplicate data in the data deduplication system by identifying fingerprint matches using a direct inter-region fingerprint lookup to search for the fingerprint matches in at least one of a plurality of metadata regions, the metadata regions each comprising a certain area of user space swapped in and out of memory and containing fingerprints for all data chunks written to the certain area of user space, wherein, for data writes to a given one of the metadata regions, the direct inter-region fingerprint lookup first searches an index of the fingerprints within the given one of the metadata regions, and subsequently searches a separate yet supplemental central fingerprint index if the fingerprint matches are not found within the given one of the metadata regions, the central fingerprint index indicating in which of the plurality of metadata regions the fingerprints reside; and
    deduplicating the identified duplicate data using the identified fingerprint matches from at least one of the index within the given one of the metadata regions and the central fingerprint index.

2. The method of claim 1, further including establishing an active owners list for each of the at least one of the plurality of metadata regions; wherein the active owners list comprises a list of each metadata region in which a reference has been created by way of the fingerprint matches.

3. The method of claim 2, further including, for new data writes to the at least one of the plurality of metadata regions, searching for the fingerprint matches within each metadata region established on the active owners list.

4. The method of claim 3, further including searching for the fingerprint matches in the central metadata fingerprint index if a match is not found within each metadata region established on the active owners list.

5. The method of claim 2, further including adjoining a metadata region to the active owners list based upon one of a predetermined memory consumption threshold and a central processing unit (CPU) consumption threshold the metadata region will occupy.

6. The method of claim 2, further including defining a fingerprint lookup threshold; wherein a quantity of unsuccessful attempts to locate the fingerprint matches in metadata regions contained on the owners list triggers a central fingerprint index lookup.

7. The method of claim 2, further including evicting a metadata region from the owners list based upon a predetermined threshold of unsuccessful fingerprint matches, pursuant to an eviction policy.

8. The method of claim 7, further including establishing one of a most frequently used, most recently used, least frequently used, and least recently used list developed pursuant to the eviction policy.

9. A system for identifying data in a data deduplication system, the system comprising:
    at least one processor device, wherein the processor device:

identifies duplicate data in the data deduplication system by identifying fingerprint matches using a direct inter-region fingerprint lookup to search for the fingerprint matches in at least one of a plurality of metadata regions, the metadata regions each comprising a certain area of user space swapped in and out of memory and containing fingerprints for all data chunks written to the certain area of user space, wherein, for data writes to a given one of the metadata regions, the direct inter-region fingerprint lookup first searches an index of the fingerprints within the given one of the metadata regions, and subsequently searches a separate yet supplemental central fingerprint index if the fingerprint matches are not found within the given one of the metadata regions, the central fingerprint index indicating in which of the plurality of metadata regions the fingerprints reside; and deduplicates the identified duplicate data using the identified fingerprint matches from at least one of the index within the given one of the metadata regions and the central fingerprint index.

10. The system of claim 9, wherein the at least one processor device establishes an active owners list for each of the at least one of the plurality of metadata regions; wherein the active owners list comprises a list of each metadata region in which a reference has been created by way of the fingerprint matches.

11. The system of claim 10, wherein the at least one processor device, for new data writes to the at least one of the plurality of metadata regions, searches for the fingerprint matches within each metadata region established on the active owners list.

12. The system of claim 11, wherein the at least one processor device searches for the fingerprint matches in the central metadata fingerprint index if a match is not found within each metadata region established on the active owners list.

13. The system of claim 10, wherein the at least one processor device adjoins a metadata region to the active owners list based upon one of a predetermined memory consumption threshold and a central processing unit (CPU) consumption threshold the metadata region will occupy.

14. The system of claim 10, wherein the at least one processor device defines a fingerprint lookup threshold; wherein a quantity of unsuccessful attempts to locate the fingerprint matches in metadata regions contained on the owners list triggers a central fingerprint index lookup.

15. The system of claim 10, wherein the at least one processor device evicts a metadata region from the owners list based upon a predetermined threshold of unsuccessful fingerprint matches, pursuant to an eviction policy.

16. The system of claim 15, wherein the at least one processor device establishes one of a most frequently used, most recently used, least frequently used, and least recently used list developed pursuant to the eviction policy.

17. A computer program product for identifying data in a data deduplication system, by a processor device, the computer program product embodied on a non-transitory computer-readable storage medium having computer-readable program code portions stored therein, the computer-readable program code portions comprising:

an executable portion that identifies duplicate data in the data deduplication system by identifying fingerprint matches using a direct inter-region fingerprint lookup to search for the fingerprint matches in at least one of a plurality of metadata regions, the metadata regions each comprising a certain area of user space swapped in and out of memory and containing fingerprints for all data chunks written to the certain area of user space, wherein, for data writes to a given one of the metadata regions, the direct inter-region fingerprint lookup first searches an index of the fingerprints within the given one of the metadata regions, and subsequently searches a separate yet supplemental central fingerprint index if the fingerprint matches are not found within the given one of the metadata regions, the central fingerprint index indicating in which of the plurality of metadata regions the fingerprints reside; and an executable portion that deduplicates the identified duplicate data using the identified fingerprint matches from at least one of the index within the given one of the metadata regions and the central fingerprint index.

18. The computer program product of claim 17, further including an executable portion that establishes an active owners list for each of the at least one of the plurality of metadata regions; wherein the active owners list comprises a list of each metadata region in which a reference has been created by way of the fingerprint matches.

19. The computer program product of claim 18, further including an executable portion that, for new data writes to the at least one of the plurality of metadata regions, searches for the fingerprint matches within each metadata region established on the active owners list.

20. The computer program product of claim 19, further including an executable portion that searches for the fingerprint matches in the central metadata fingerprint index if a match is not found within each metadata region established on the active owners list.

21. The computer program product of claim 18, further including an executable portion that adjoins a metadata region to the active owners list based upon one of a predetermined memory consumption threshold and a central processing unit (CPU) consumption threshold the metadata region will occupy.

22. The computer program product of claim 18, further including an executable portion that defines a fingerprint lookup threshold; wherein a quantity of unsuccessful attempts to locate the fingerprint matches in metadata regions contained on the owners list triggers a central fingerprint index lookup.

23. The computer program product of claim 18, further including an executable portion that evicts a metadata region from the owners list based upon a predetermined threshold of unsuccessful fingerprint matches, pursuant to an eviction policy.

24. The computer program product of claim 23, further including an executable portion that establishes one of a most frequently used, most recently used, least frequently used, and least recently used list developed pursuant to the eviction policy.

* * * * *